(12) United States Patent
Wade

(10) Patent No.: US 9,107,531 B2
(45) Date of Patent: Aug. 18, 2015

(54) CITRUS JUICERS

(75) Inventor: Adam Wade, Hampshire (GB)

(73) Assignee: KENWOOD LIMITED, Havant, Hampshire (GB)

( * ) Notice: Subject to any disclaimer, the term of this patent is extended or adjusted under 35 U.S.C. 154(b) by 500 days.

(21) Appl. No.: 13/510,961

(22) PCT Filed: Nov. 11, 2010

(86) PCT No.: PCT/GB2010/002078
§ 371 (c)(1),
(2), (4) Date: Jul. 2, 2012

(87) PCT Pub. No.: WO2011/061475
PCT Pub. Date: May 26, 2011

(65) Prior Publication Data
US 2012/0260810 A1     Oct. 18, 2012

(30) Foreign Application Priority Data

Nov. 19, 2009  (GB) .................................. 0920205.2

(51) Int. Cl.
*A47J 19/02*     (2006.01)
*A23N 1/00*     (2006.01)

(52) U.S. Cl.
CPC *A47J 19/02* (2013.01); *A23N 1/003* (2013.01)

(58) Field of Classification Search
CPC ......... A47J 19/02; A47J 19/022; A23N 1/003
USPC .......... 99/504, 501, 505, 503, 502; 100/98 R, 100/213, 133
See application file for complete search history.

(56) References Cited

U.S. PATENT DOCUMENTS 1,977,011 A * 10/1934 Orfanson ........................ 99/486
2,121,621 A *  6/1938 Adams ............................ 99/503
(Continued)

FOREIGN PATENT DOCUMENTS

| EP | 0226691 | 7/1987 |
| FR | 1164016 | 10/1958 |
| FR | 1260092 | 5/1961 |

OTHER PUBLICATIONS

International Search Report dated Feb. 14, 2011 for PCT/GB10/02078.
Written Opinion dated May 19, 2012 for PCT/GB10/02078.

*Primary Examiner* — Reginald L Alexander
(74) *Attorney, Agent, or Firm* — Paul D. Bianco; Martin Fleit; Fleit Gibbons Gutman Bongini & Bianco PL

(57) ABSTRACT

The invention relates to citrus juicers of the kind in which a reamer is supported upright on a shaft driven by an electric motor so that half of a citrus fruit may be pressed down onto the reamer for juice extraction. Typically such juicers are fitted with an arm (20) that carries a hollow pressing member which is intended to be lowered, by pivoting the arm, so as to press a half-fruit onto the reamer, and it is usual for the arm (20) to return to its fully raised position after use. Accordingly, the arm (20) is spring-urged towards its raised position and tends to adopt the raised position during storage and transit. The invention provides a latching means (50) to latch the arm (20) in a lowered position, thus allowing the juicer to be stored and moved around with the arm latched down, thereby making the juicer more compact and easier to handle. It is particularly preferred that the arm (20) is further provided with a damping device, such as a rotary viscous damper (60), to control upward movement of the arm (20) when it is released from the latching means (50).

12 Claims, 5 Drawing Sheets

(56) References Cited

U.S. PATENT DOCUMENTS

| | | | | |
|---|---|---|---|---|
| 2,692,550 A | * | 10/1954 | Smith | .......................... 100/213 |
| 4,706,559 A | | 11/1987 | De Zarate | |
| 6,138,556 A | * | 10/2000 | Yu et al. | .......................... 99/504 |
| 2007/0125244 A1 | | 6/2007 | Hensel | |

* cited by examiner

CITRUS JUICERS

FIELD OF THE INVENTION

This invention relates to citrus juicers and, in particular, to electrically powered citrus juicers in which a reamer is supported upright on a shaft driven by an electric motor so that half of a citrus fruit may be pressed down onto the reamer to extract juice therefrom. The reamer is usually of substantially conical shape, mounted with its apex pointing upwards and is formed with juice-extracting ribs, or other protuberances, outstanding from its surface.

BACKGROUND OF THE INVENTION

Such juicers are well known, and the present invention is especially relevant to a class of such juicers in which an arm, pivotally mounted to a casing which encloses the electric motor and supports the reamer, carries a hollow pressing member which is intended to be lowered by the arm so as to press a half-fruit onto the reamer and thereby facilitate the juice-extraction process. Typically, the pressing member is formed as a hollow cone, or a portion of a cone, and such juicers are described, for example, in FR-A-1164016 and EP-A-0226691.

It will be appreciated that the use of arm-assisted citrus juicers of the above kind can pose problems, since the juicing process has to start with the arm raised, so that the fruit to be pressed can be introduced into place above the reamer, and appliances known to date have thus provided spring assistance to ensure that the arm always returns to its fully raised position after use. This means that the appliance, as a whole, has a height which is disproportionate to its other dimensions; this being a particular nuisance when the appliance is stored and out of use, or in transit. It also means that, if the spring assistance is powerful enough to reliably fully raise the lever, it tends to be sufficient to cause a strong reaction on the appliance as a whole when the arm reaches its fully raised position and encounters a mechanical stop. This reaction may well be strong enough to result in a physical shift of the appliance, depending to an extent on the nature of the surface on which the appliance is supported. Even if this does not happen, however, the reaction can create a jolt, which is disconcerting for the user.

SUMMARY OF THE INVENTION

It is an object of this invention to ameliorate at least one of the above-mentioned problems.

According to the invention there is provided a citrus juicer comprising an upstanding reamer 504, disposed on a shaft 508 drivable by an electric motor 508 and configured, when so driven, to extract juice from halved citrus fruits pressed thereon; the juicer further comprising a casing 502 housing said motor and supporting said reamer, and an arm member 20 mounted for pivotal movement relative to said casing and bearing a pressing member 510 adapted to press the fruit onto the reamer; said arm having a raised position in which said pressing member is clear of said reamer and being lowerable from said raised position to press the fruit onto the reamer, wherein there is provided means 512 urging said arm towards the raised position, and wherein a latching means is provided for latching the arm in a lowered position. This provides for the arm to be latched down, against the urging force, when the appliance is out of use, or is in transit, for example whilst being manipulated into place for use.

The urging means 512 conveniently comprises one or more torsion springs 512, though coil spring arrangements, leaf spring arrangements or any other convenient resilient means can be used instead, or in addition, if preferred.

Preferably the latching means comprises a mechanism mounted to an upstand fixedly mounted to the casing and to which the arm is pivotally mounted. By this means, the latching means can be operated via user-actuable means provided on the upstand.

It is further preferred that the latching means comprises a protuberance configured to engage with a notch or recess in a component which moves as the arm pivots relative to the upstand. It is particularly preferred that the said component is directly associated with a pivotal mount for said arm on said upstand.

The protuberance is preferably spring-loaded for engagement into said notch or recess, whereby the user-actuatable means can be set to a latching position whilst the arm is in its raised position and the latch engaged automatically when the arm is lowered sufficiently.

In a most preferred example, the arm is further provided with a damping means adapted to resist movement of the arm towards its raised position, whereby the urging means and the damping means together ensure that the arm moves controllably towards said raised position, and stops gently thereat.

It is preferred, in such examples of the invention, that the damping means comprises a rotary viscous damper of a kind in which a housing holds a viscous material within which a vaned element rotates when driven by an external force applied to a pinion or like device, to an axle of which the vanes are mounted. Preferably the rotary viscous damper is mounted in said upstand and the pinion is driven by a rack member associated with the arm.

In particularly preferred embodiments, a casing of the latching means is formed with a cut-out to accommodate said rotary viscous damper and the two components are nestedly mounted in said upstand, thereby providing a compact arrangement.

BRIEF DESCRIPTION OF THE DRAWINGS

In order that the invention may be clearly understood and readily carried into effect, one embodiment thereof will now be described, with reference to the accompanying drawings, of which:

Referring now to the drawings, FIG. 1 shows an upstand 10 with an arm 20 pivotally mounted thereto at 30. A turnable shaft 40, comprising a user-operable actuator for a latching mechanism, protrudes from the upstand 10, and is intended to carry a knurled knob or some other form of interactive element that facilitates user manipulation of the actuator.

It will be appreciated that the upstand 10 is fixedly mounted to a casing of a citrus juicer of the kind already described, in which the casing supports an upstanding reamer and houses an electric motor which drives a shaft on which the reamer is mounted so that, by use of the motor to rotate the reamer, juice can be extracted from halved citrus fruits pressed down onto the reamer. The arm 20 is pivotally mounted to the casing (via the upstand 10) and bears a pressing member (not shown) adapted to press the fruit onto the reamer, and possibly also a lid or closure member (not shown) intended to cover the active elements of the juicer when the juicer is in operation. The arm 20 has a raised position, in which the pressing member is clear of said reamer, and can be lowered from its raised position to an operational position, in which it can be used to facilitate pressing the fruit onto the reamer. Since, however, the elements of the citrus juicer other than the upstand 10, and arm 20 (together with components directly associated therewith and now to be described in detail) are not germane to this invention, and can take any convenient form, they are not shown and will not be further described herein.

Figure 1:
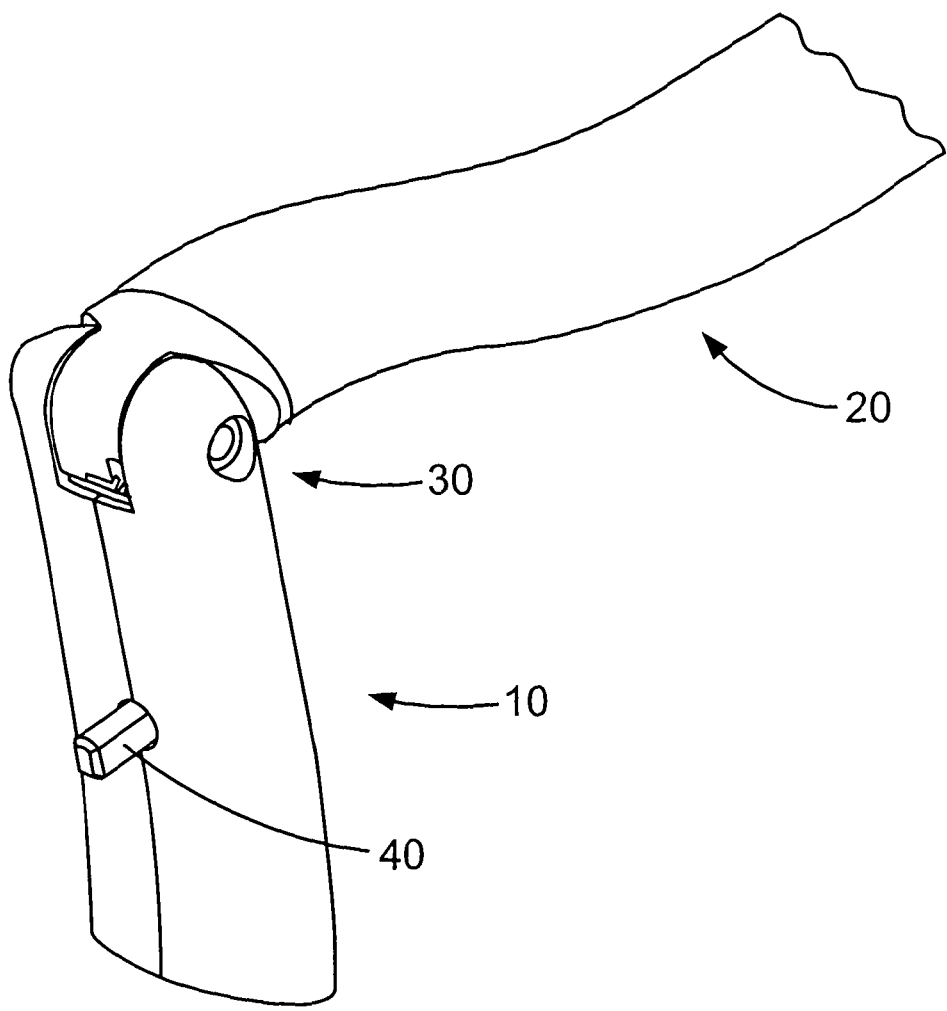
FIG. 1 shows an arm of a citrus juicer of the kind under consideration, together with an upstand to which the arm is pivotally mounted.
Figure 2:
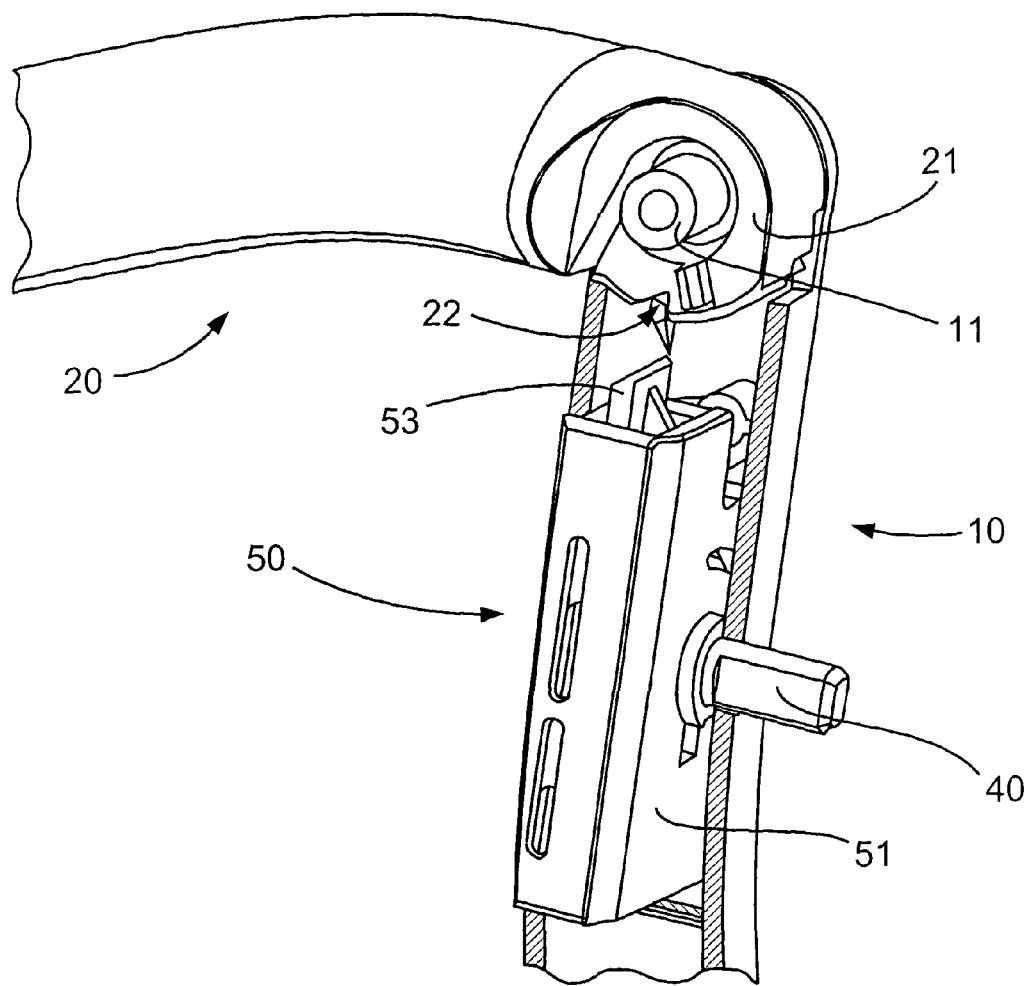
FIG. 2 shows, in cut-away form, the mounting of a latching means in the upstand, with the latch in a disengaged position.
Figure 3:
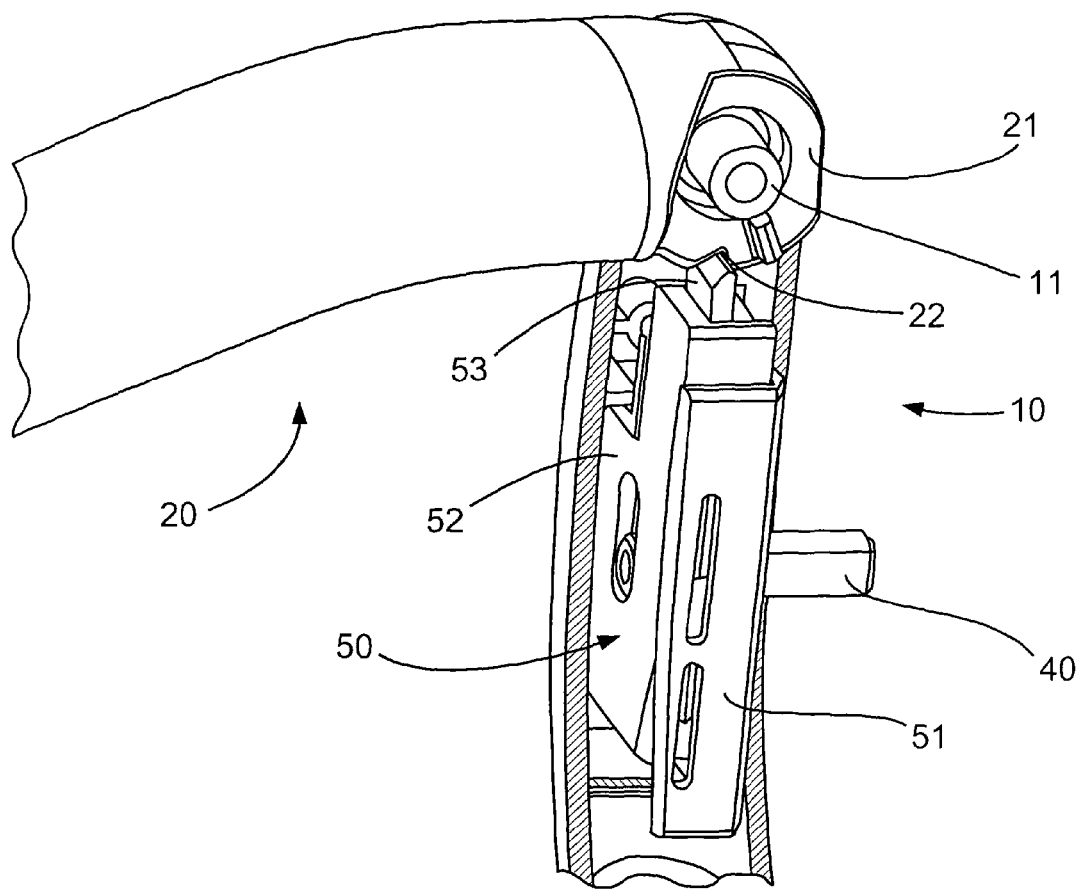
FIG. 3 shows, also in cut-away form, the mounting of the latching means in the upstand, with the latch in an engaged position.
Figure 5:
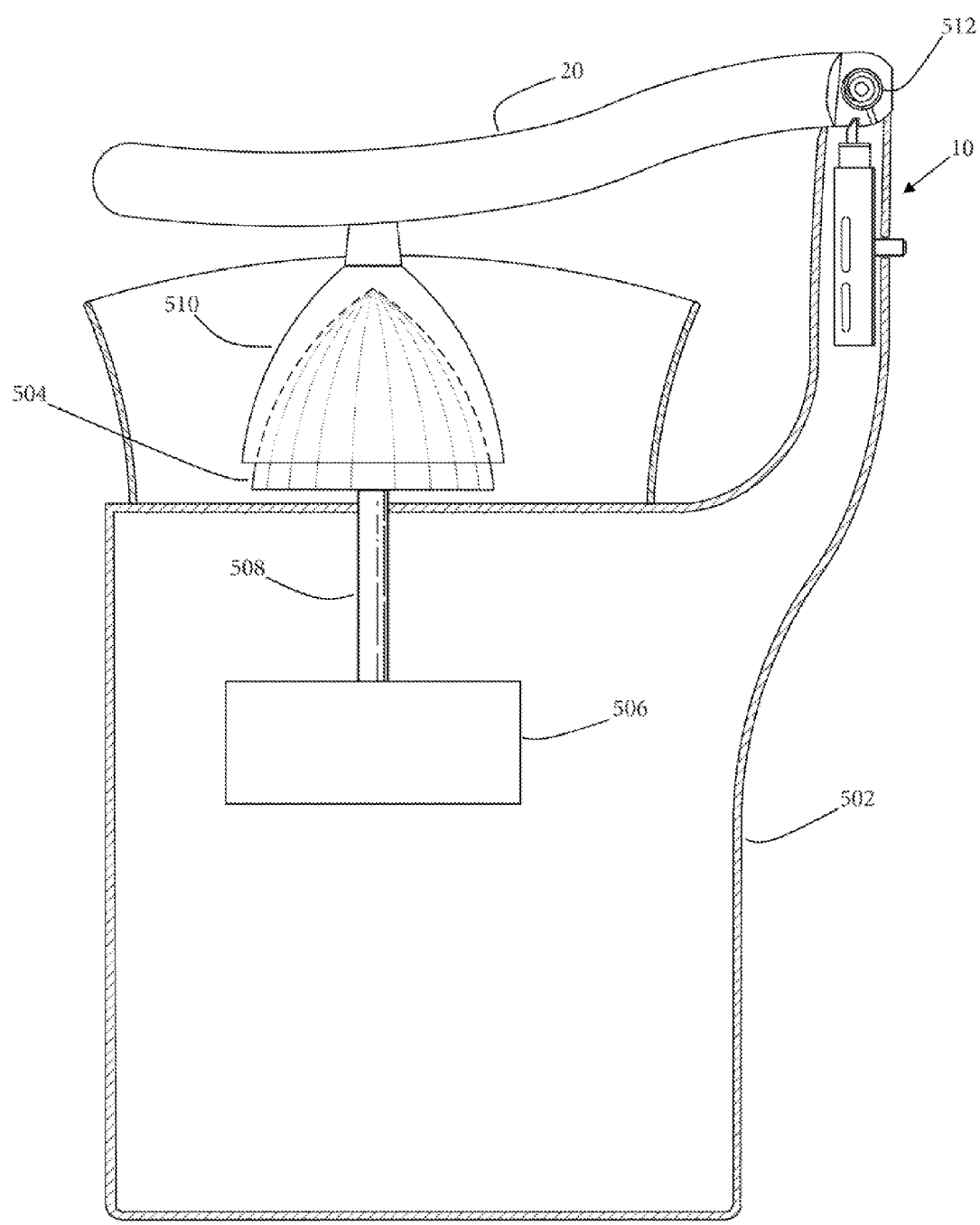
FIG. 5 is a cross-sectional view of an example of a juicer of the kind under consideration.

Referring now to FIGS. 2 and 3, the arm 20 pivots relative to the upstand 10, about an axle 11. The axle 11 is surrounded by a torsion spring 512 (shown in FIG. 5) and a trunnion part 21 of the arm 20; the torsion spring being connected to the trunnion 21 and the axle 11 so as to urge the arm 20 into a raised position, in which the arm makes a significant obtuse angle with the upstand 10, providing clearance to enable fruit to be placed upon the reamer.

A latching means 50 is mounted within a hollowed area of the upstand 10 for sliding motion relative to the upstand as will now be described. The latching means 50 comprises a fixed casing part 51 which houses a slidably movable carriage 52 which in turn supports a protruding latch 53. The latch is spring loaded relative to the carriage 52; the spring (not shown) urging the latch 53 outwardly of the carriage 52 towards the extended or protruding position shown in FIGS. 2 and 3. The application of sufficient mechanical force to the latch itself, however, causes the latch 53 to retract towards, and partially into, the carriage 52, for a reason which will become clear later.

FIG. 2 shows the latching means 50 in an unlatched condition, intended for normal usage of the juicer, in which the latch 53 is withdrawn from a notch or recess 22 in the external surface of the trunnion 21 of arm 20. In this condition, the arm 20 is urged towards its raised position by the aforementioned torsion spring, but can be lowered manually by a user simply pressing upon the arm. FIG. 3, on the other hand, shows the latching means in a latched condition, intended for storage or transit, in which it latches the arm 20 in a lowered position where it makes, in this embodiment, substantially a right angle with the upstand 10. In other embodiments, however, the angle made by the arm with the upstand may be acute or obtuse. In any event, in the latched condition, the protruding latch 53 engages into the notch or recess 22 and prevents the arm 20 from moving towards its raised position, despite the urging of the aforementioned torsional spring. This latching of the arm 20 is convenient for storage and movement of the citrus juicer, since the arm is constrained to the height of the remaining components of the juicer and is firmly held in a compact position.

A user may operate the latching means 50 by manipulating the actuator 40 whilst holding the arm 20 down. Alternatively, a user may prefer to manipulate the actuator 40 whilst the arm is raised, and then lower the arm manually; the spring associated with the latch 53 then allowing the latch to ride around the trunnion 21, moving towards or into the carriage 52 as necessary, until the latch 53 snaps into the notch or recess 22.

By these means, the arm can be reliably latched to the upstand 10 in a lowered position relative to the casing that, as mentioned above, supports or contains all of the active elements of the juicer, thereby enabling the juicer to be readily moved into or out of an operating position and stored without a requirement for excessive headroom, and without risk of damaging the arm itself and/or other components by knocking the arm against solid surfaces or edges, for example those presented by the undersides of cabinets or shelves, such as may be mounted above a worktop on which the juicer is used.

It is an optional feature of the invention to provide a damping means which can prevent the arm from being raised excessively rapidly into its fully raised position by the influence of the aforementioned torsion spring acting between the upstand 10 and the arm 20, and jolting or even physically moving the juicer by stopping abruptly when it reaches the uppermost extremity of its travel.

Figure 4:
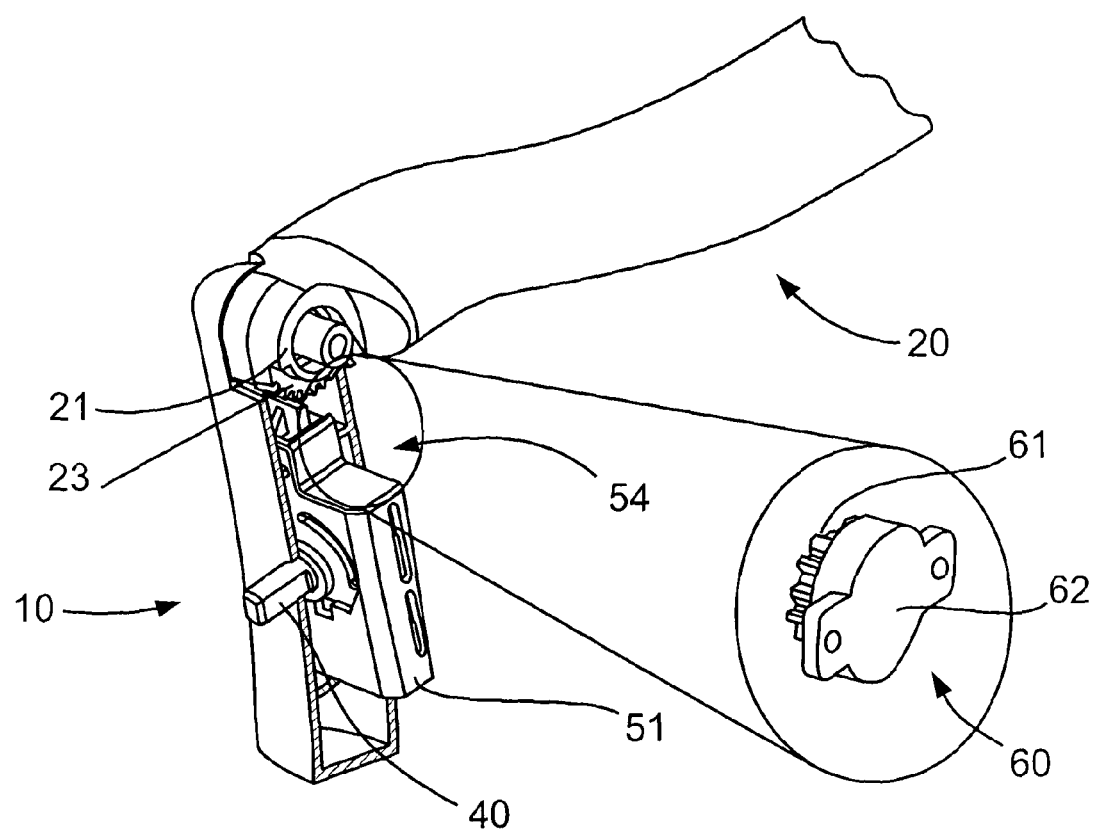
FIG. 4 shows the mounting of a rotary viscous damper in nested relationship to the latching means in the upstand.

In this example of the invention, as shown in FIG. 4, the fixed casing part 51 of the latch 50 is shaped, as shown at 54, to form a space in which a rotary viscous damper 60 can be mounted; the damper having an external pinion 61 coupled to an axle which supports a plurality of vanes for rotation in a viscous fluid contained within a casing 62. Thus, the casing part 51 of the latching means 50 is formed with a cut-out as shown at 54, specifically dimensioned and positioned to accommodate said rotary viscous damper 60, whereby the latching means 50 and the rotary viscous damper 60 are nestedly mounted in the upstand 10, such that both can separately interact with respective components of the arm 20, and thereby providing a usefully compact arrangement.

The pinion 61 of the damper 60 is positioned to be driven by a rack-like gear 23, formed on the trunnion 21 of the arm 20, as the arm is raised relative to the upstand 10; the rotation of the vanes within the casing 62 of the damper 60, caused by the meshing of the pinion 61 with the gear 23, being resisted by the viscous fluid within the casing 62, thereby providing a damping action which causes the arm to raise slowly and controllable, and to stop gently when fully raised.

It will be appreciated that alternative damping means can be provided if preferred without departing from the scope of the invention.

It will further be appreciated that the latch 53 used in the latching means 50, and the co-operative associated component on the arm 20 can take different forms. In one particular example, the latch comprises a profiled pin which is configured to enter a hole formed in the arm.

The invention claimed is:

1. A citrus juicer comprising an upstanding reamer, disposed on a shaft drivable by an electric motor and configured, when so driven, to extract juice from halved citrus fruits pressed thereon; the juicer further comprising a casing housing said motor and supporting said reamer, and an arm member mounted for pivotal movement relative to said casing and bearing a pressing member adapted to press the fruit onto the reamer; said arm having a raised position in which said pressing member is clear of said reamer and being lowerable from said raised position to press the fruit onto the reamer, wherein there is provided means urging said arm towards the raised position, and wherein a latching means is provided for latching the arm in a lowered position; and wherein the arm is further provided with a damping means adapted to resist movement of the arm towards its raised position, whereby the urging means and the damping means together ensure that the arm moves controllably towards said raised position, and stops gently thereat.

2. A juicer according to claim 1, wherein the damping means comprises a rotary viscous damper of a kind in which a housing holds a viscous material within which a vaned element rotates when driven by an external force applied to a pinion or like device, to an axle on which the vanes are mounted.

3. A juicer according to claim 2, wherein the rotary viscous damper is mounted in said upstand and the pinion is driven by a rack-like gear member associated with the arm.

4. A juicer according to claim 2, wherein a casing of the latching means is formed with a cut-out to accommodate said rotary viscous damper and the latching means and the rotary viscous damper are nestedly mounted in said upstand, thereby providing a compact arrangement.

5. A juicer according to claim 1, wherein the urging means comprises a torsion spring.

6. A juicer according to claim 1, wherein the latching means comprises a mechanism mounted to an upstand fixedly mounted to the casing and the arm is pivotally mounted.

7. A juicer according to claim 6, further comprising user-actuatable means, provided on the upstand, to permit manual operation of the latching means.

8. A juicer according to claim 6, wherein the latching means comprises a protuberance configured to engage with a notch or recess in a component which moves as the arm pivots relative to the upstand.

9. A juicer according to claim 8, wherein the protuberance or pin of said latching means is spring-loaded for engagement into said notch or recess or said hole, whereby the user-actuatable means can be set to a latching position whilst the arm is in its raised position and the latch engaged automatically when the arm is lowered sufficiently.

10. A citrus juicer comprising an upstanding reamer, disposed on a shaft drivable by an electric motor and configured, when so driven, to extract juice from halved citrus fruits pressed thereon; the juicer further comprising a casing housing said motor and supporting said reamer, and an arm member mounted for pivotal movement relative to said casing and bearing a pressing member adapted to press the fruit onto the reamer; said arm having a raised position in which said pressing member is clear of said reamer and being lowerable from said raised position to press the fruit onto the reamer, wherein there is provided means urging said arm towards the raised position, and wherein a latching means is provided for latching the arm in a lowered position; wherein the latching means comprises a mechanism mounted to an upstand fixedly mounted to the casing and to which the arm is pivotally mounted; and wherein the latching means comprises a pin configured to engage with a hole in said arm.

11. A juicer according to claim 10, wherein the means urging said arm towards the raised position comprises a torsion spring.

12. A citrus juicer comprising an upstanding reamer, disposed on a shaft drivable by an electric motor and configured, when so driven, to extract juice from halved citrus fruits pressed thereon; the juicer further comprising a casing housing said motor and supporting said reamer, and an arm member mounted for pivotal movement relative to said casing and bearing a pressing member adapted to press the fruit onto the reamer; said arm having a raised position in which said pressing member is clear of said reamer and being lowerable from said raised position to press the fruit onto the reamer, wherein there is provided means urging said arm towards the raised position, and wherein a latching means is provided for latching the arm in a lowered position; wherein the latching means comprises a mechanism mounted to an upstand fixedly mounted to the casing and to which the arm is pivotally mounted; wherein the latching means comprises a protuberance configured to engage a notch or recess in a component which moves as the arm pivots relative to the upstand; and wherein said component is directly associated with a pivotal mount for said arm on said upstand.

* * * * *